OR   3,764,192

United States Patent
Wheeler

[11] 3,764,192
[45] Oct. 9, 1973

[54] OPTICAL RASTER SCAN GENERATOR
[75] Inventor: Bryce A. Wheeler, Los Angeles, Calif.
[73] Assignee: Hughes Aircraft Company, Culver City, Calif.
[22] Filed: May 28, 1971
[21] Appl. No.: 152,466

[52] U.S. Cl. ............... 350/7, 178/7.6, 350/285
[51] Int. Cl. ........................................ G02b 17/00
[58] Field of Search .................... 350/6, 7, 285; 178/7.6; 250/234, 235, 236

[56] References Cited
UNITED STATES PATENTS

| | | | |
|---|---|---|---|
| 3,436,546 | 4/1969 | Derderian et al. | 350/7 X |
| 3,468,229 | 9/1969 | Bellows | 350/6 UX |
| 3,447,852 | 6/1969 | Barlow | 350/7 |
| 3,478,662 | 11/1969 | Baker | 350/6 UX |

Primary Examiner—Ronald L. Wibert
Assistant Examiner—Michael J. Tokar
Attorney—W. H. MacAllister and Lawrence V. Link, Jr.

[57] ABSTRACT

Optical apparatus for scanning a field of view in a raster pattern including a motor-driven spinning mirror structure having a plurality of substantially optically flat mirrors positioned substantially uniformly about the axis of spin of the structure with the surfaces of the mirrors normal to a radial direction from the axis of spin; an oscillating, substantially planar, mirror positioned to intercept reflected light from a portion of the aforementioned spinning mirror structure, said oscillation being about an axis which is parallel to a plane which is perpendicular to the axis of spin of the spinning mirror structure, the spinning mirror structure producing the line sweeps of the raster scan and the oscillating mirror indexing the line sweeps over the raster scan to cause the line sweeps to be substantially uniformly spaced, said axis of oscillation being located so that light impinging from a fixed source or pupil onto said oscillating mirror will for any position in the oscillation of said mirror be reflected through a common fixed area constituting a virtual aperture or pupil, said pupil being the origin point for said elevation scan and the axis of said spinning mirror being located so as to place the center of each face of said mirror successively at said virtual pupil whereby both said elevation and azimuth scans appear to originate from said fixed area virtual pupil thereby precluding astigmatic distortion when said scan is optically coupled to a magnifying system having its optical axis passing through said fixed area.

19 Claims, 7 Drawing Figures

Bryce A. Wheeler
INVENTOR.
BY.
Ernest L. Brown
ATTORNEY.

OPTICAL RASTER SCAN GENERATOR

BACKGROUND OF THE INVENTION

The apparatus of this invention is adapted to project substantially collimated radiation such as light or infrared radiation in a raster pattern. Alternatively, the apparatus is adapted to receive such radiation and to scan a radiation field in a raster pattern.

This invention is directed to the optical-mechanical portion of the apparatus. Typical electronics is described and claimed in co-pending United States Patent application, entitled, "Thermal Imaging System," filed concurrently herewith by Peter J. Laakman and assigned to Hughes Aircraft Company, the assignee of this invention.

PRIOR ART

To produce a raster scan which appears to originate from substantially a single point by optical-mechanical means, it is desirable that two mirrors rotatable about mutually perpendicular axes be placed within the optical system and that one mirror be tiltable about an axis to generate the raster lines in one angular direction and a similar mirror tiltable for generating angular indexing of the raster lines about the other axis.

One might place within an optical beam two spinning mirror blocks having mirror faces thereon and rotating about two mutually perpendicular axes deviating the beam through a raster format. Unfortunately, two spinning mirror blocks may not occupy the same space at the same time and require separation in order to generate two orthogonal fan scans. The substantial separation between the origin of the two generated fans, prevents scuch a scanner from being used in conjunction with orthogonally symmetrical optics. No practical mechanism for achieving a scan which appears to be about substantially one point has hitherto been conceived except by optically combining two such fan beams to achieve an apparent common point of scan. Such prior art devices have two multi-faceted blocks spinning mutually perpendicular and the point of rotation generated by the first block is projected through optical relay elements coincident to the point of rotation of the second block, thereby producing what appears optically to be a common point of scan without mechanical interference between faceted blocks. The use of such relay elements introduces geometrical errors, optical-mechanical complexity, and substantially reduces the efficuency of light transmission through the optical system.

BRIEF DESCRIPTION OF THE INVENTION

In the following description, the scanning of a raster line is described as an azimuth scan, and the indexing scan from raster line to raster line is described as an elevation scan. While it is understood that the usual orientation of the apparatus is as described, it is not intended that the invention sould be avoided by merely turning the apparatus, for example, upon its side. Accordingly, where the terms "azimuth" and "elevation" are described herein, although that is the usual orientation of the apparatus, what is meant is a pair of axes, one shown in FIG. 1 as lying in a vertical direction, having a multi-faceted mirror block 10 spinning around it to produce the individual raster lines of scan in the azimuth direction and the other axis having a mirror assembly 28 which is able to turn about it through a limited angle to produce an indexing of the scanning line in the elevation direction. The axis of rotation of the elevation mirror 28 does not intersect the axis of rotation of the azimuth mirror 10, but it is perpendicularly related to it in the sense that the axis of rotation of the mirror 28 is parallel to a plane which is perpendicular to the axis of rotation of the azimuth mirror block 10. For example, in FIG. 1 the projection of the axis through shaft 25 does not intersect the axis about which the mirror block 10 rotates. However, the axle or axis 24 is parallel to the plane of the upper flat surface or top of the mirror block 10 which in turn is perpendicular to the vertical axis through the shaft about which the mirror block 10 rotates.

It should be noted that, in standard television nomenclature, the generated sweeps are designated as horizontal and vertical sweeps even if the television tube is turned on its side so that the "horizontal" sweep is actually vertical and the "vertical" sweep is actually horizontal.

The apparatus contemplated by this invention has, first, a multi-faceted mirror structure spinning about the azimuth axis (shown in the vertical direction) with the mirror surface sequentially reflecting radiation toward a stationary objective lens. The size, shape and geometrical location of the received beam reflecting from the mirror surfaces is defined by the aperture and field stops of the objective lens system. The nominal point of rotation of the fixed beam generated by the rotating mirror structure is called for description purposes "the pupil" and, as may be seen in FIG. 1 wherein the circle P is shown as the pupil, is located normal to the midfield optical center line and is centered on each of by the reflecting mirror surfaces of the multi-faceted mirror structure when that surface is normal to the mid-field optical center line. This is the common point or fixed area from which both scans appear to originate in either the receiving or transmitting mode of operation of the device. The beam reflected off the multi-faceted mirror strikes a nodding mirror before entering the objective lens in the receiving made and is focused onto a radiation sensor. The nodding mirror oscillates through an angle about an axis parallel to a plane which is perpendicular to the axis of rotation of the multi-faceted mirror and generates an angular stepping in elevation. The position of the axis of rotation of the nodding mirror is important and locates the pupil P which contains the apparent point of rotation of the beam in elevation and azimuth coincident. The nodding mirror axis position will be further described.

It is to be understood that the flow of light or radiation through the system may be described in either direction. One might project a stationary collimated light produced for example, by a laser. The laser would produce collimated light of a specific size and shape which would be projected against the nodding mirror, thence onto one of the multi-faceted mirror surfaces and outward in a raster pattern from the apparatus, or through a magnifying optical system to alter the field of view scanned before leaving the apparatus Such a spherical magnifying optical system can be used with this scan apparatus since its aperture can be aligned with the area P of common origin of the scans so that no astigmatic distortion will result. Alternatively, a field might be sampled in a raster pattern with incoming radiation reflecting off a mirror surface of the multi-faceted structure, then the nodding mirror, and along a predetermined, fixed axis where the radiation can be collected and focused upon a photo sensor. A magnifying optical system may be located in front of the apparatus to magnify the viewed field, in which case the magnifying optics are aligned with "the pupil" and compatible with the optical beam projected through the raster generator, thereby avoiding astigmatic distortion as noted above.

It is therefore an object of this invention to scan a field of radiation in a raster pattern.

It is another object of this invention to project radiation in a raster pattern.

It is a more specific object of this invention to provide apparatus and method for achieving the above-enumerated objects.

BRIEF DESCRIPTION OF THE DRAWINGS

Other objects will become apparent from the following description, taken in connection with the accompanying drawings, in which.

DETAILED DESCRIPTION OF THE INVENTION

Because of the optical apparatus of this invention is bilateral, it may be described either as a radiation projector or as a radiation receptor. That is, it may be described as an apparatus which projects radiation such as light or infrared radiation in collimated beams which trace a raster scan, or it may be described as an apparatus which samples a radiation field of collimated light in a raster scan. For convenience and clarity, the apparatus will be described as a projector.

It is further to be stressed that the raster scan is described with the lines substantially horizontal and substantially uniformly spaced apart in a vertical direction. It is to be understood that the designations "horizontal" and "vertical" are for explanation purposes only and are more convenient than repeatedly reciting "a first direction and a second direction perpendicular to said first direction." Further, the moving mirrors will be described as rotatable about azimuth and elevation axes. That, too, is for convenience only. In a typical operation of the invention, the so-called azimuth axis will actually be an azimuth axis and the so-called elevation axis will be an elevation axis. That is, the azimuth axis will be vertical and producing a horizontal sweep, and the elevation axis will be horizontal and producing a vertical sweep. However, the clear meaning of the description of the apparatus is not to be avoided by merely turning the apparatus onto its side.

Referring to FIGS. 1, 3, 6 and 7, a substantially point source of light or other radiation 32 is stopped by a stop 31 and collimated by a collimating lens 30. The collimated light is then reflected from mirror 28 onto the mirror surfaces of the spinning mirror structure 10. A motor 11 spins the mirror structure 10 at a high speed. The mirror structure 10 has a plurality of substantially flat mirror surfaces 10a, b, c, . . . uniformly distributed about the axis of spin 307 thereof and having their surfaces perpendicular to radial lines drawn from the axis of spin of structure 10. The spinning mirror structure 1 produces the line sweeps of the raster scan. A pinion gear, such as the hypoid gear 12, drives a corresponding spur gear 14. The axis of rotation of the spur gear 14 is perpendicular to the axis of the mirror structure 10. The shaft 16 of the gear 14 carries a cam 18 which is followed by a cam follower 26 adapted to rotate about a shaft 25 whose axis is perpendicular to the axis of rotation of the structure 10. The cam follower 24 has a follower wheel 26 which is adapted to ride upon the surface of the cam 18. On the other end of the cam follower 24 is positioned a mirror 28. The mirrors 10a, 106, 10c, 10d . . . are called the azimuth scan mirrors. The mirror 28 is called the elevation scan mirror.

The cam 18 is a substantially linear cam. That is, it causes the cam follower 24 to rotate substantially linearly or proportional to the rotation of the cam until a return portion is reached. The linear portion of the cam 18 uses approximately 85 percent of the cam surface. The remaining 15 percent is used to return the cam follower to its starting position. The linearity of the cam may be adjusted, if desired, to compensate for slight variations in the line-to-line spacing of the raster scan. Such a raster scan is shown in the region of 34, 36, 38, and 40 of FIG. 1.

Figure 6:
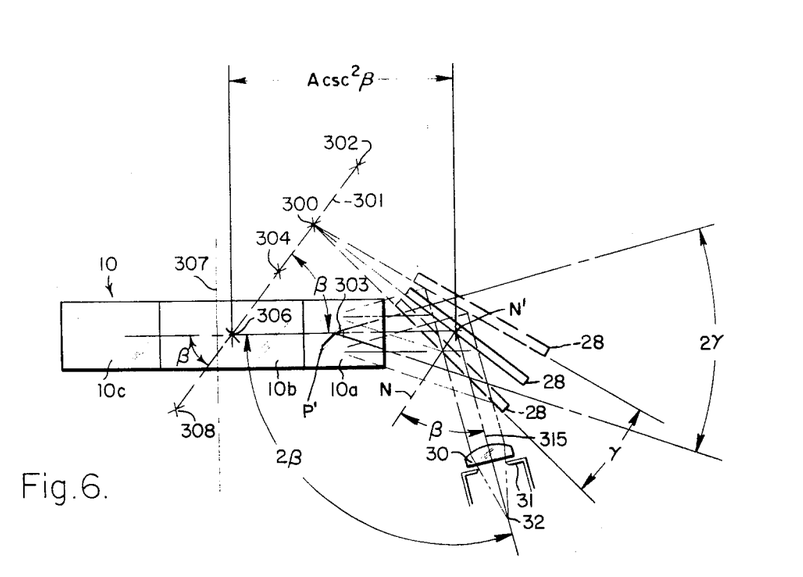
FIGS. 6 and 7 are ray diagrams introduced to explain the invention more specifically.
Figure 7:
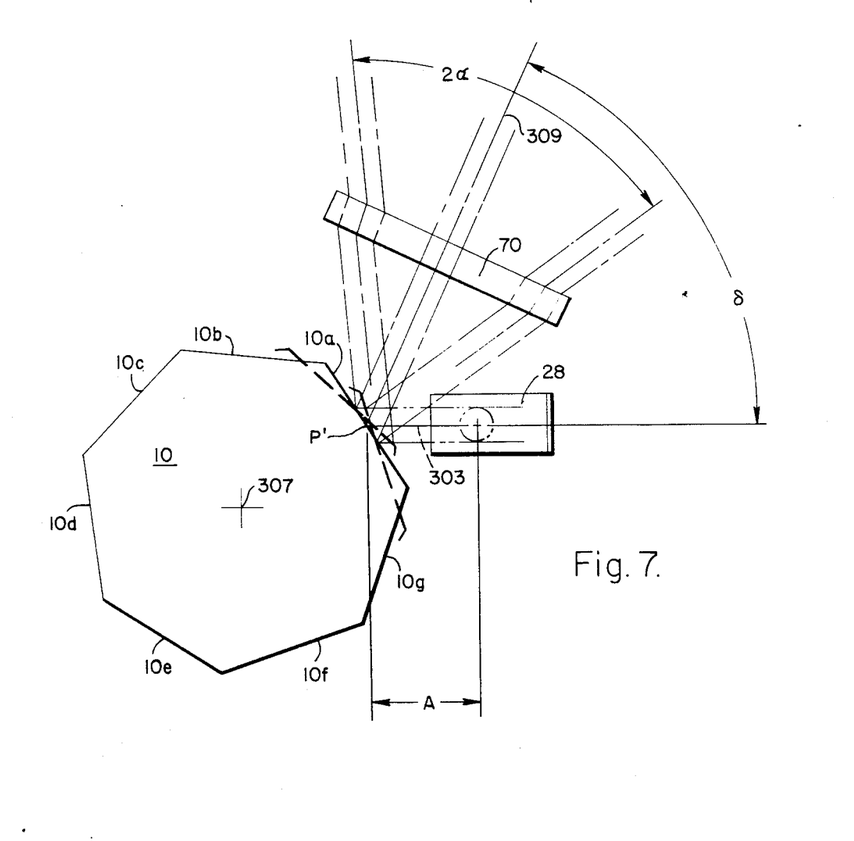

The geometry of the optical system may be observed in FIGS. 6 and 7. A source of collimated light is produced from a point source 32 by a collimating lens 30. The collimated rays are produced in a pencil or bundle by the optical stop 31. The nodding mirror 28 is shown in its two extreme positions in dashed lines and in its substantially centered position by the solid line in FIG. 6. The centered position of the nodding mirror 28 is used for design purposes, whereby the design of the optical system is exactly correct with the mirror 28 in such substantially centered position, the design with the mirrors in their extreme positions deviating a minimal amount from such exactly correct position so that distortion or non-linearities in the sweep are within tolerances. It must be stressed that while the choice of the substantially centered position of the mirror 28 is preferable, it is within the scope of this invention that any selected position of the nodding mirror 28, designated the nominal position thereof, may be used for design purposes with the resulting introduction of non-linearities due to the swing of the mirror 28 from its nominal position. After such nominal position is chosen, the resulting non-linearities of the system must be within the required tolerances for the particular use the designer has in mind. Although the invention will be described with the design position or nominal position substantially centered between the two extreme positions of the mirror 28, it is not essential that such nominal position be chosen there.

Further, the angle of incidence $\beta$ of the collimated light from the lens 30 striking the mirror 28 when the mirror 28 is in its nominal position is ordinarily 45°. An angle different than 45° is shown to demonstrate the generality of the invention.

With the mirror 28 in its nominal position, the collimated light from the lens 30 strikes the mirror 28 at an angle of incidence $\beta$. The angle of reflection equals the angle of incidence $\beta$. The axis of rotation 307 of the rotating mirror structure 10 is positioned perpendicular to the reflected collimated light when the mirror 28 is in its nominal position Since the azimuthal axis of rotation 307 is assumed to be in the vertical, it follows that this perpendicularity to the reflected principal ray 303 is achieved by positioning the nominal or central solid line position of the mirror 28 such that the angle of reflection between the horizontal central ray 303 and the normal to the mirror surface 28 is equal to $\beta$ which is also the angle of incidence of the ray 315 from the fixed source 32 onto the surface of the mirror 28 as shown in FIG. 6. The angles between the mirror surface 28 and the rays 315 and 303 themselves are thus each equal to the compliments of $\beta$, that is, to 90° minus $\beta$. The pencil or bundle of collimated light reflected from the mirror 28 intercepts the mirror surfaces 10a, b, c . . . of the rotating mirror structure 10.

A locus of a line of centers 301 is defined, intercepting the central or principal ray 303 (which is reflected from the mirror 28 when it is in its nominal position) at a distance $A\csc^2\beta$ (which is equal simply to 2A for the usual case when $\beta$ equals 45° since the csc of 45° is equal to 2). This distance is measured from the point of incidence of such ray 303 upon the mirror 28 to the point of intersection of the locus line 301 with the principal ray 303.

A locus of a line of centers, one of which may be selected for the center of rotation of the nodding mirror 28, is shown at 301. The line of centers 301 is turned from the central or principal ray 303 through the angle $\beta$ in a direction (here shown upward) which is the same direction as the direction of reflection of the ray 303 turned from the mirror 28. Equivalently, as shown in FIG. 6, this may be stated that where the incident ray 315 is at an angle $\beta$ to the normal, N, to the surface of the mirror 28 which angle is formed by a counterclockwise rotation of the normal N into the incident ray 315, then the reflected principal ray 303 is also rotated counterclockwise through an angle $\beta$ to define the angle of intersection between the principal ray 303 and the locus 301 for the lines of center or axes of rotation of the elevation mirror 28. The center of rotation of the nodding elevation mirror 28 may be chosen at any point, such as points 300, 302, 304, 306 or 308, on the line 301 when the line 301 intersects principal ray 303 at that angle $\beta$ and at the distance $A\csc^2\beta$ from the point of reflection N' of the incident ray 315 from the mirror 28 and in any one of these positions the collimated beam from source 32 will be reflected to a single point P' at the center of the pupil P and will stay at that point as the mirror 28 is oscillated from its central solid line position through an elevation field angle $\gamma$ to the two dash line positions shown in FIG. 6. The point 300 has an advantage in that it offers the shortest radius of rotation of the mirror 28 and thereby the minimum excursion of the mirror 28 and the minimum moment of inertia to cover the desired field of view. This point 300 is selected on line 301 such that the mirror 28 in its oscillating excursions will physically just clear the rotating mirror wheel 12, will not obstruct the reflected beam and will position the point N' at which the incident beam 315 is reflected from the mirror 28 in its nominal central position at a distance equal to A from the point P' at the center of the virtual or reflected pupil. The geometry discussed above in FIG. 6 is such as to position the active face 10a of the rotating mirror wheel 10 at this same distance A in order to reflect the virtual pupil P into the rest of the system.

The collimated light reflected from the mirror 28 strikes the mirror surfaces of rotating structure 10. For example, as shown in FIG. 7, the collimated light, defined by the central ray 303, strikes the mirror surface 10a and is reflected through the window 70. It is convenient to define a nominal angle of incidence $\delta$ which the central ray 303 makes with the surface 10a when the central ray 303 is reflected substantially into the center of the line of scan as shown at 309 in FIG. 7. The optics are exact at this nominal angle. By choosing the nominal angle wherein the central ray 309 is substantially in the center of the line of scan, non-linearities introduced at the extreme positions shown an angle $\alpha$ on either side thereof are minimized. It is to be stressed, however, that some other angle could be chosen as the nominal design angle, whereby the non-linearities introduced on at least one of the extreme positions of the scan would be greater and the non-linearities in the other extreme position would be smaller than that for the configuration shown. It is, therefore, not essential, although it is preferable, that the nominal angle $\delta$ be measured on a ray at the center of a line scan. The angle $\alpha$ is chosen large enough to produce a desired useful line length to the scan and small enough to avoid interference with the mirror 28.

A conductive pin 20 is positioned upon the cam member 18, and a stationary electrode 22 is positioned adjacent the cam member 18 to produce a synchronizing pulse. When the pin 20 reaches the proximity of the stationary electrode 22, an electrical pulse is generated. The pulse may be generated by the change in electrical capacity between the members 20 and 22 when a voltage is placed between the members 20 and 22. A source for the voltage is not shown.

Similarly, an electrode 42 may be positioned adjacent the rotating mirror structure 10. By making at least the portion of the structure 10 adjacent the mirrors of a conducting material, electrical pulses are delivered to the electronics 55 when the corners of the structure 10 at the intersection of two adjacent mirrors approaches the electrode 42. Details of the electrical system 55 are not shown. It is preferable, but not necessary, that the structure 10 be entirely made of metal.

The invention may be characterized as an apparatus having at least five axes defined thereon including the axes of rotation of both the azimuthal and elevation mirrors as well as the central optical axes defined by the principal or central rays when the elements are in their nominal design positions shown in FIGS. 6 and 7. It will be seen therein that the first axis 315 has an angle of incidence and the second axis 303 has an angle of reflection $\beta$ relative to the mirror 28 when the mirror 28 is in its nominal position. One may specify the relation between the second axis 303 and the first axis 315 as the second axis being turned from the first axis through an angle of $(180° - 2\beta)$ degrees in a counterclockwise direction of rotation about the point N' as a pivot. The third axis 301 is the locus of the possible locations at which the elevational axis of rotation of the mirror 28 perpendicularly intersects the plane of the drawing in FIG. 6 and this locus line 301 is coplanar with the first and second axes 315 and 303. The third axis 301 intercepts the second axis 303 at a distance 2A from the interception of the first and second axes when the angle $\beta$ has its preferred value of 45° and more generally intercepts this second axis at a distance $A \csc^2\beta$ from the intersection point N' of the first and second axes. The third axis 301 is turned from the second axis, through an angle $\beta$, in the same (counter clockwise) sense that the second axis is turned relative to the first axis. The axis of spin 307 of the mirror structure 10 is the fourth axis and is parallel to the plane of the first three axes. Usually the axis of spin 307, which has also been referred to as the azimuthal axis of rotation of the mirror structure 10, is offset from the second axis 303. The fifth axis 309 intercepts the second axis 303 at a distance A from the interception of the first two axes 315 and 303. The fifth axis 309, which from FIG. 7 may be seen to intersect the surface 10a at the point P' at the center of pupil P, is in a plane perpendicular to the plane of the first three axes and forms an angle $\delta$ with the second axis when the mirror structure 10 is in its predetermined nominal position. The usable portion of the sweep of each of the mirror surfaces 10a, b, c, . . . is within an angular region $2\alpha$ about the fifth axis 309. When the structure 10 turns through an angle $\alpha$ the optical sweep is through an angle $2\alpha$. Similarly when the oscillating mirror 28 oscillates through an angle $\gamma$, the optical sweep is through an angle $2\gamma$. The oscillating mirror 28 oscillates about an axis which intercepts the third axis and is perpendicular to the plane of the first three axes. Preferably, the axis of rotation of the mirror 28 is as near as practicable to the mirror 28 so that the moment of inertia of the mirror 28 may be minimized. Location of this elevational axis of rotation of the mirror 28 perpendicular to any point on the third axis or locus 301 is, however, a necessary and sufficient condition in order that the beam having the central axis 315 shall be reflected from any of the oscillatory positions of the mirror 28 through a single virtual pupil P having its center at the point P'.

Further, it is convenient to characterized the mirror structure 10, in its preferred embodiment, as a polygonal cylinder. That is, the sides form a polygon and the surfaces of the sides are parallel to the axis of spin 307. Further, in a preferred embodiment, the polygonal cylinder is a right cylinder wherein the top and bottom surfaces form parallel planes perpendicular to the axis of spin 307.

Collimated light projected onto mirror 28 along the first axis 315 is then swept through an angle $2\gamma$ by the oscillation of the mirror 28. Similarly, radiation directed onto the mirror surfaces 10a, b, c, . . . of the structure 10 is swept through an angle at least equal to $2\alpha$. The sweeping through the angle $2\alpha$ produces a line sweep, and the sweeping through the angle $2\alpha$ produces a line-to-line indexing of the raster scan.

It is further to be emphasized that the window 70 is not necessarily in all embodiments of the invention. In some embodiments, such as when infrared radiation is scanned, it is important that the interior of the apparatus either be evacuated or have a predetermined atmosphere. Under such circumstances a window 70 is used. When a window 70 is used, particularly when infrared scanning occurs, the window 70 is not necessarily perpendicular to the axis 309, but is preferably tilted thereto through an angle of, for example, on the order of 18° or more, to prevent so-called narcissus effect wherein the reflection of the sensor 32 from the wondow 70 is in turn sensed by the sensor. By tilting the window 70, reflections of the sensor are no longer sensed.

The invention has been described as a mechanism for projecting collimated light. Alternatively, it may receive and sense a collimated light. Assuming that the light is approaching in a field of view shown by the raster of FIG. 1 wherein the sampling areas 34, 36, 38 and 40 are shown in the corners of the field, the apparatus of this invention allows regions of the incoming radiation to be sampled in bundles or pencils such as that shown at 34, 36, 38 and 40, and the field of view is scanned in a raster pattern. The incoming radiation strikes the rotating mirror structure 10 upon the mirror surfaces 10a, b, c, . . . thereof and is reflected onto the nodding mirror 28, thence into the lens 30 from which it is focused, through the stop 31, onto a sensor 32 which delivers a signal of the radiation intensity to the electronics 60. The pulses from the electrodes 22 and 42 are also delivered to the electronics 60 which uses them to produce a pattern on the cathode oscillograph 62 indicative of the intensity of the incoming radiation in the region instanteously scanned.

Figure 4:
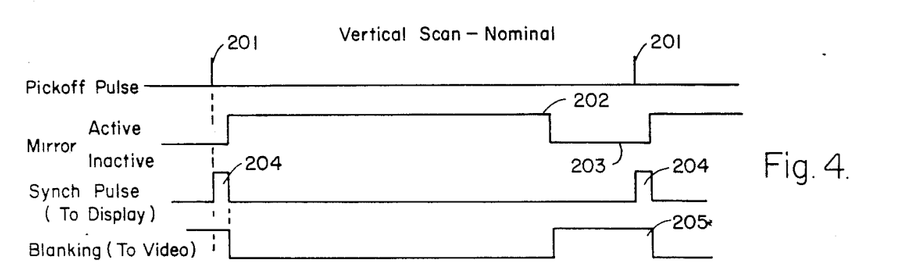
FIG. 4 is a timing chart of a typical vertical scan sequence for the embodiment of FIGS. 1 and 3.
Figure 5:
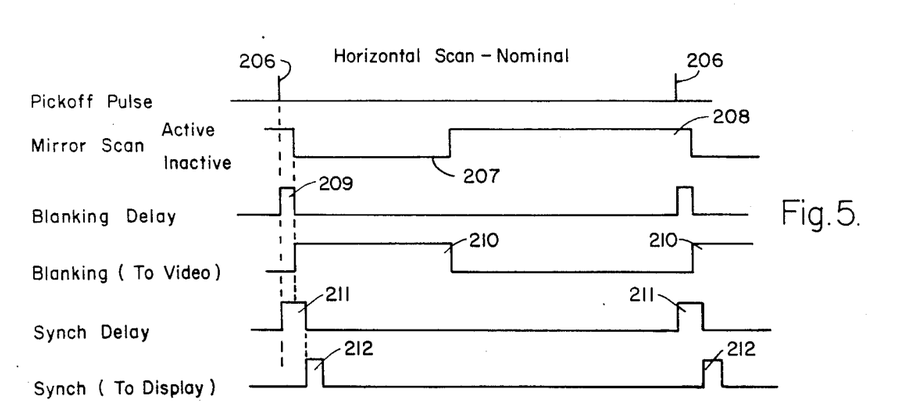
FIG. 5 is a timing chart of a typical horizontal scan sequence for the embodiment of FIGS. 1 and 3.

In FIGS. 4 and 5 are wave forms, using the pulses from electrodes 22 and 42 and adapted to control the electronics 60. Typical electronics which are useful with this apparatus are shown and described in said copending United States patent application, "Thermal Imaging System," filed concurrently herewith by Peter J. Laakman and assigned to Hughes Aircraft Company, the assignee of this invention. Details of the electronics 60 are not shown, nor are they claimed herein.

Typical pulses generated on the electrode 22 are shown at 201 in FIG. 4. The pick-off pulses 201 are used to generate synchronizing pulses 204 for use by the cathode ray oscillograph display 62. The signals 203 and 205 are disabling pulses which prevent the output of the detector 32 from being displayed on the cathode ray oscillograph 62. The timing of the signals 203 and 205 are such that the cam follower 24 is in the return portion of the cam during the time that the signals 203 and 205 are produced. Thus, during the time of the signals 203 and 205 the elevation mirror 28 is returning to its starting position which is analogous to jumping from the bottom of the raster scan to the top thereof, or alternatively, from the top thereof to the bottom thereof depending upon the direction of the raster scan.

Figure 1:
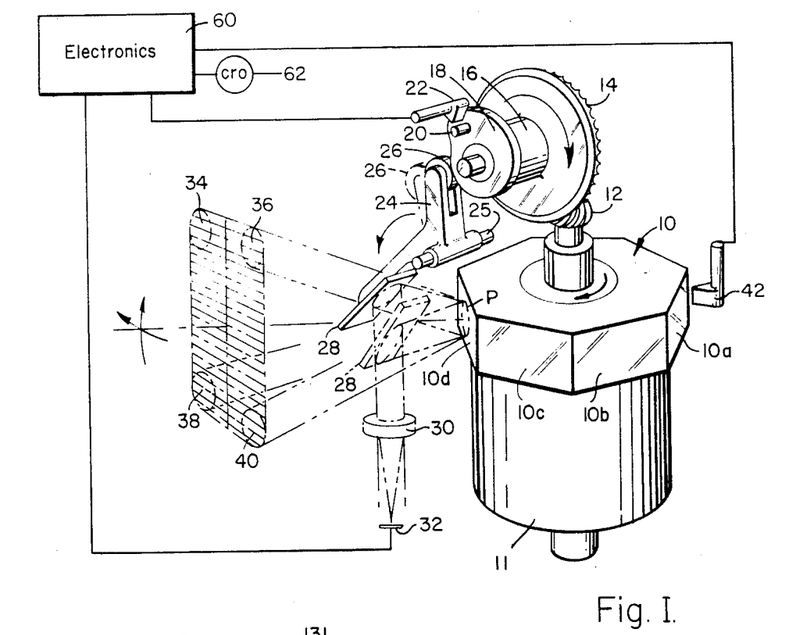
FIG. 1 is a schematic view of the working parts of a typical apparatus in accordance with this invention.
Figure 3:
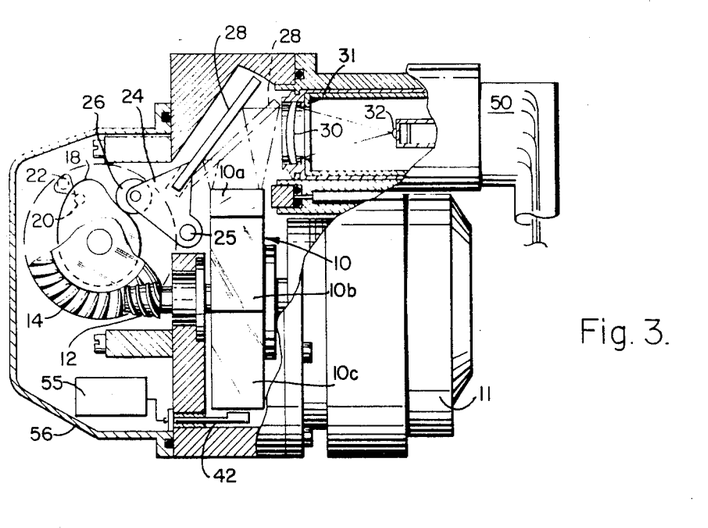
FIG. 3 is a more detailed view, partly in section, of the apparatus of FIG. 1.

The pulses generated on the pickoff 42 in the embodiment of FIGS. 1 and 3 are shown at 206 in FIG. 5. The pulses 206 produce blanking delays 209. The delays 209 are introduced to allow the electronics sufficient time to commence operating. At the end of the delays 209, a blanking signal j210 is produced which deactivates or blanks the signal from the sensor 32. After a predetermined period of time which allows a particular mirror surface 10a, b, c, . . . to move into position for scanning, the blanking signal 210 is removed and a single line of scan commences. It is desirable that the synchronizing pulse 212 be delivered to the display at the time of fly-back of a line sweep. The fly-back takes a predetermined period of time, whereby the synchronizing pulse 212 is positioned that predetermined time prior to the removal of the blanking signal 210. The synchronizer pulse delay signal 211 is adjusted to cause the synchronizing pulse 212 to appear at the proper time.

Figure 2:
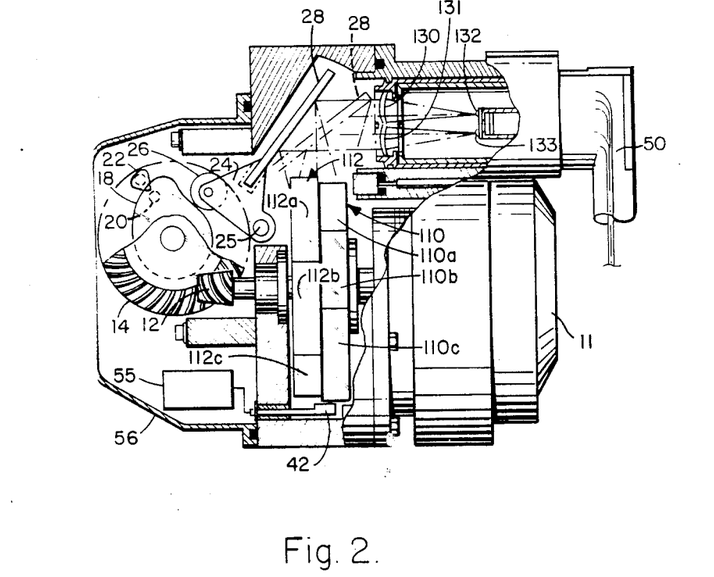
FIG. 2 is a view, partly in section of a second embodiment of the invention using a double multi-faceted wheel.

An alternative embodiment of the rotating mirror structure 10 is shown at 110 in FIG. 2. The rotatable mirror structure 110 has two sets of mirror surfaces, each substantially identical with that shown at 10a, b, c, ... of FIG. 1. A first set of mirror surfaces 110a, b, c, ... and a second set of mirror surfaces 112a, b, c, ... are shown side-by-side in FIG. 2, and they rotate together. The sets of mirror surfaces are angularly positioned relative to each other, preferably through a one-half mirror length. That is, for example, the intersection between surfaces 112a and 112b is angularly positioned to align with substantially the middle of the mirror surface 110b. Each of the sets of mirrors 110a, b, c, ... and 112a, b, c, ... has associated therewith a separate sensor and lens system. For example, the mirror surfaces 110a, b, c, ... direct incoming light off of the mirror 28 into lens 130 and thence onto the detector 132. The mirror surfaces 112a, b, c, ... direct light off of mirror 28 into the lens 131 and onto the detector 133. In the embodiment of FIG. 2, the electronics is adjusted such that when detector 132 is blanked, detector 133 is operating, and when detector 133 is blanked, detector 132 operates. In other respects the structure of FIG. 2 is substantially identical with that of FIG. 1. It should be noted, however, because of the staggered relation of the two sets of mirrors 110a, b, c, ... and 112a, b, c, ..., the pickoff 42 produces twice as many synchronizing signals, and the synchronizing signals can be used to control, for example, a flip-flop circuit which is used to control blanking of the sensors 132 and 133. The geometrical relationship between the sensors 132, 133, the lenses 130, 131, the elevation mirror 28, and the sets of mirrors 110a, b, c, ... and 112a, b, c, ... are substantially identical with that described in connection with the single set of mirror structure.

In a typical apparatus wherein the number of mirror surfaces on the mirror structure such as that of FIG. 1 is seven, or wherein there are two sets of seven mirrors as shown in the apparatus of FIG. 1, a typical speed for the motor 11 is 67,500 r.p.m. A typical value for the angle δ is 65°, for α is 2.6°, for β is 45°, and for γ is 16.2°. With a motor speed of 67,500 r.p.m. and seven mirror surfaces on the structure 10, one achieves an azimuth scan efficiency of 42 precent, producing 525 azimuth scans per frame with 60 elevation scans per second and elevation scan efficiency of 85, a frame rate of 15 frames per second, a field coverage of 32.4° by 43.2°, and an interlace of four.

In the timing diagram of FIG. 4, the time between pickoff pulses 201 is typically 16.667 milli-seconds. The time delay between the receipt of the pickoff pulse and the end of the blanking pulse is 205 microseconds. The duration of activity of the mirror is 14.167 milli-seconds. The length of the blanking pulse 203 is 2,500 milli-seconds. The length of the synchronizing pulse 204 is 210 microseconds.

In the diagram of FIG. 5, the time between the pickoff pulses 206 is 126.98 microseconds. The length of blanking delay is 2.47 microseconds. The length of the blanking 207 is 73.65 microseconds. The time of duration of active mirror scan 208 is 53.33 microseconds. The length of sync delay 211 is 4.47 microseconds. The length of the sets of mirrors 110a, b, c, ... and 112a, b, c, ... are substantially identical with that described in connection with the single set of mirror structure.

In a typical apparatus wherein the number of mirror surfaces on a mirror structure such as that of FIG. 1 is seven, or wherein there are two sets of seven mirrors as shown in the apparatus of FIG. 2, a typical speed for the motor 11 is 67,500 r.p.m. A typical value for the angle δ is 65°, for α is 30°, and for β is 45°. With a motor speed of 67,500 r.p.m. and seven mirror surfaces on the structure 10, one achieves an azimuth scan efficiency of 42 precent, producing 525 azimuth scans per frame with 60 elevation scans per second and elevation scan efficiency of 85, a frame rate of 15 frames per second, a field coverage of 30° by 43.2°, and an interlace of four.

In the timing diagram of FIG. 4, the time between pickoff pulses 201 is typically 33.333 milli-seconds. The time delay between the receipt of the pickoff pulse and the end of the blanking pulse is 205 microseconds. The duration of activity of the mirror is 28.333 milli-seconds. The length of the blanking pulse 203 is five milli-seconds. The length of the synchronizing pulse 204 is 210 microseconds. The length of the delay between the syncrhonizing pulse and the blanking pulse 205 is 28.328 milli-seconds.

In the diagram of FIG. 5, the time between the pickoff pulses 206 is 211.64 microseconds. The length of blanking delay is 2.47 microseconds. The length of the blanking 207 is 84.07 microseconds. The time of duration synchronizing pulse 212 is two microseconds. This timing is achieved by using a ratio of azimuth to elevation speed reducer of 18.75 to one.

The apparatus of this invention, therefore, scans the pupil of the lens 30 and stop 31 to produce a raster scan of collimated radiation all of which appears to originate in both the azimuth and elevation scan from the single virtual pupil P which is the reflection of the pupil of the lens 30 reflected from mirror 28 and which, in turn, is reflected by the mirror wheel 10 due to the fact that the azimuthal axis of rotation is that wheel 10 is positioned so as to locate the faces of the mirror wheel at the location of the virtual pupil P. Alternatively, the apparatus scans a field of collimated light in a raster pattern and delivers radiation from the scanned portion to a sensor 32 in the reverse of this relationship and thereby produces a scan image of the field which is free from astigmatic distortion by virtue of the location of the pupil P and which may, therefore, be derived through a suitable spherical magnifying objective lens having its optical axis positioned along the axis 309.

Although the apparatus has been described in detail above, it is not intended that the invention should be limited by that description, but only in accordance with spirit and scope of the appended claims:

I claim:

1. In combination:
   a frame;
   a rotatable mirror structure mounted for rotation about a spin axis relative to said frame, including a plurality of radially directed axes defined on and rotating with said structure perpendicular to said spin axis, said axes being substantially uniformly spaced about said spin axis, a plurality of mirror surfaces on said mirror structure, each said mirror surface being perpendicular to a different one of said radial axes;
   means forming a mirror surface, mounted for oscillation relative to said frame about an oscillation axis parallel to a plane which is perpendicular to said spin axis;
   said oscillating mirror being positioned in a light path which periodically includes each of sad rotating mirror surfaces.

2. In combination:

means defining a first optical axis;

means forming an angularly oscillating mirror surface intercepting said optical axis, said oscillating mirror, when at a preselected nominal position in its swing, defining a second optical axis in the direction of reflection of said first optical axis, the angle of incidence of said first optical axis upon said mirror surface and the angle of reflection of said second optical axis, when said mirror surface is in its norminal position, defining an angle $\beta$.

a rotatable mirror structure having a shape substantially as a polygonal cylinder, the sides thereof forming mirror surfaces, said second optical axis being positioned when said first-mentioned mirror surface is in its nominal position, in a plane substantially parallel to the top and bottom of said mirror structure, a third optical axis defined in said plane, said third axis being coincident with the reflection of said second optical axis from one of said mirror surfaces of said mirror structure when said mirror structure is in a predetermined nominal angular position relative to said second optical axis so that rotation of said mirror structure causes said third optical axis to sweep in a line, and oscillation of said oscillating mirror produces line-to-line indexing of said line sweeps by said third optical axis, both the sweep of said third optical axis and the indexing of said sweep appearing to originate from a common virtual pupil on said mirror surface from which said second optical axis is reflected to form said third optical axis.

3. Means for producing a nonastigmatic optical raster scan comprising:

a frame having at least five axes defined thereon, the second said axis intercepting the first said axis and turned from said first axis through an angle $(180° - 2\beta)$ degrees, the third said axis intercepting said second axis at a distance $A \csc^2\beta$ from the interception of said first and second axes and turned from said second axis through an angle $\beta$, said first, second and third axes being coplanar, said fourth axis being perpendicular to said second axis and parallel to the plane of said first three axes, said fifth axis intercepting said second axis a distance $A$ from said interception of said first and second axes, said second and fifth axes defining a plane perpendicular to the plane of said first three axes and said fifth axis being turned from said second axis through an angle $\delta$;

a rotatable mirror structure rotatable about said fourth axis, including a plurality of radial directions defined thereon perpendicular to said fourth axis, having a plurality of mirror surfaces thereon, each perpendicular to a different said radial direction, said mirror surfaces being positioned to intercept said second axis consecutively when said structure is rotated;

an oscillating mirror structure having limited rotation about an axis centered on and perpendicular to said third axis and parallel to the plane of said second and fifth axes, said oscillating mirror structure having a mirror surface thereon intercepting said first and second axes.

4. Apparatus as recited in claim 3 and further comprising means for spinning said mirror structure about said fourth axis and for oscillating said oscillating mirror structure in a predetermined synchronism.

5. Apparatus as recited in claim 4 in which rotation of said mirror structure produces an optical sweep about said fifth axis through a usable angle $2\alpha$, whereby radiation delivered in a bundle substantially along said second axis to said mirror surfaces of said rotatable mirror structure is projected and swept through at least an angle $2\alpha$ from said fifth axis about an axis parallel with said fourth axis and radiation delivered, at least within an angular region $2\alpha$ of said fifth axis, to said mirror surfaces of said rotatable mirror structure is scanned and delivered substantially along said second axis to said oscillating mirror structure.

6. Apparatus as recited in claim 5 wherein $\alpha$ is substantially 30°.

7. Apparatus as recited in claim 4 wherein the oscillation of said oscillating mirror structure is through an angle $\gamma$ whereby radiation delivered substantially along said first axis to said oscillating mirror is projected and swept at least through an angle $2\gamma$, and radiation received through at least an angle $2\gamma$ about an axis passing through the intersection of said second and fifth axes and perpendicular to the plane of said first and second axes at least through an angle $2\gamma$ is delivered and projected substantially along said first axis.

8. Apparatus as recited in claim 4 and further comprising means for producing a pencil of beams substantially along said first axis.

9. Apparatus as recited in claim 8 in which said means comprises a substantially point source of light, a collimating lens, and an optical stop between said source and said lens.

10. Apparatus as recited in claim 4 and further comprising means for sensing a pencil of radiation received along said first axis from said oscillating mirror.

11. Apparatus as recited in claim 10 in which said mean for sensing comprises a radiation sensor, a focusing lens for focusing incoming radiation on said sensor, and on optical stop between said lens and said sensor.

12. Apparatus as recited in claim 4 wherein said means for spinning said mirror structure and for oscillating said oscillating mirror structure comprises:

a motor, said mirror structure being connected to the shaft of said motor to rotate therewith;

a pinion gear connected to said shaft to rotate therwith;

a spur gear meshing with said pinion gear and adapted to rotate about a shaft whose axis is perpendicular to the shaft of said pinion gear;

a cam, connected to rotate with said spur gear, said cam having a predetermined contour for oscillating said oscillating mirror structure in a predetermined program;

a cam follower following said cam and connected to said oscillating mirror structure to cause said oscillating mirror structure to oscillate with the oscillation of said cam follower.

13. Apparatus as recited in claim 12 in which said pinion gear and said spur gear are helical gears.

14. Apparatus as recited in claim 12 wherein said cam is a substantially linear cam over at least a portion of the periphery thereof.

15. Apparatus as recited in claim 11 and further comprising means for sensing the rotation of said cam.

16. Apparatus as recited in claim 3 wherein $\beta$ is substantially 45°.

17. Apparatus as recited in claim 3 wherein $\delta$ is substantially 65°.

18. Apparatus as recited in claim 3 and further comprising pickoff means for sensing the transition between consecutive mirror surfaces of said mirror structure.

19. Means for producing a nonastigmatic optical raster scan comprising:
- a first mirror mounted for constrained oscillation about an elevation axis and positioned to reflect an optical pupil to a single fixed position virtual pupil in any position within its constrained oscillation;
- a multifaceted mirror wheel rotatable about an azimuth axis and positioned so that the multiple faces of said wheel will sequentially be positioned at said fixed position of said virtual pupil during the rotation of said wheel; and
- means for synchronously moving said mirrors and for mounting said first and second mirrors to position said elevation axis about which said first mirror oscillates parallel to a plane which is perpendicular to said azimuthal axis about which said mirror wheel rotates.

* * * * *